2,902,460

HEAT AND LIGHT STABLE RIGID THERMOPLASTIC POLYVINYL HALIDE COMPOSITIONS

Garland B. Jennings, Avon, and Clarence E. Parks, Bay Village, Ohio, assignors to The B. F. Goodrich Company, New York, N.Y., a corporation of New York No Drawing. Application September 2, 1954
Serial No. 453,936

5 Claims. (Cl. 260—41)

This invention relates to heat and light stable rigid thermoplastic polyvinyl halide compositions and relates more particularly to hard, rigid, thermoplastic, heat and light stable compositions comprising a vinyl halide polymer together with an interpolymer of a styrene and acrylonitrile or an alkyl methacrylate and an iron oxide pigment.

Rigid thermoplastic compositions of polyvinyl halides which are readily processable and are plasticizer-free are described in U.S. Patent 2,646,417. These compositions comprise a major proportion of a high molecular weight vinyl halide polymer and a small amount of a hard, tough, high molecular weight interpolymer of styrene and acrylonitrile of a nature described in the patent. Other rigid thermoplastic compositions comprising a major proportion of a vinyl halide polymer with a small amount of an interpolymer of styrene and alkyl methacrylates are described in a copending application of Edward G. Schwaegerle, Serial No. 433,828, filed June 1, 1954, Patent No. 2,791,600. Although both of these particularly described types of rigid compositions are outstanding and have many uses, improved heat and light stability is desirable. It is accordingly an object of this invention to provide rigid thermoplastic vinyl halide polymer compositions of improved heat and light stability.

It has now been found that the addition of iron oxide to rigid thermoplastic compositions of vinyl halide polymers with interpolymers of styrene and acrylonitrile or styrene and alkyl methacrylates and the like results in compositions with outstanding and unexpected heat and light stability.

In the practice of the invention, iron oxide in an amount defined hereinafter is added to the desired rigid vinyl halide polymer composition and mechanically mixed. This ordinarily is done on a mill or in an internal mixer as is well known to those skilled in the art. It is necessary, of course, that an intimate dispersion of the iron oxide in the polymer composition is obtained for optimum results. The particular size of the iron oxide can be varied but is preferably finely ground and is of the usual compounding pigment grade so that good dispersion is obtained and effective stabilization is obtained thereby. Iron oxides ranging in particle size from about 0.1 micron to about 1.5 microns, average 0.5 micron, are satisfactory in the compositions of the invention.

The amount of iron oxide used may be varied from about 1 to about 100 weight parts based on 100 weight parts of the resin components. More preferably, amounts from about 2 to 15 weight parts are employed. Optimum light and heat stabilization is obtained with about 4 to 8 weight parts of iron oxide.

Any of the iron oxides may be used, but preferably ferric oxides are employed. Among the ferric iron oxides used are the ferric oxides manufactured from natural ores; those obtained by a synthetic process involving precipitation of ferric ions from solution, as ferric hydroxide, which is then carefully calcined to give ferric oxide $Fe_2O_3$; brown iron oxides which are mechanical blends of yellow, red and black oxides; yellow iron oxides, which are commercially hydrated ferric oxides, and black iron oxides including precipitated ferroferric oxides corresponding to the proposed formula $Fe_2O_3 \cdot 0.8FeO$.

As mentioned above, iron oxides are effective as heat and light stabilizers for the rigid thermoplastic composition described in U.S. Patent 2,646,417, and any of the compositions described in that patent are stabilized by iron oxide. These compositions may be described as rigid thermoplastic resinous compositions comprising a homogeneous mixture of a vinyl halide polymer of a monomeric material in which each constituent contains a single olefinic double bond and in which the predominant monomer is a vinyl halide; with an interpolymer of a monoolefinic monomeric mixture comprising 50 to 90 percent by weight of a monomer selected from the class consisting of styrene and substituted styrenes including halogen, alkyl, alkoxy and the like, both alpha- and nuclear-substituted derivatives (i.e., substituted styrenes containing, as nuclear- and alpha-substituents, halogen atoms, alkyl groups, and alkoxy groups), and 10 to 50 percent by weight of an acrylic nitrile such as acrylonitrile, methacrylonitrile, ethacrylonitrile, chloroacrylonitrile and the like, copolymerizable with styrene; said interpolymer containing not to exceed 20 percent by weight of other polymerized monoolefinic monomers; and said composition containing from 1 to 40 weight parts of interpolymer based on the weight of vinyl halide polymer. Particularly valuable compositions are obtained from a mixture of about 100 weight parts of polyvinyl chloride, about 5 to 20 weight parts of a copolymer containing about 65 to 85 weight percent styrene copolymerized with about 15 to 35 weight percent acrylonitrile, and about 2 to 15 weight parts of ferric oxide. Similarly, other useful heat and light stable compositions are obtained when a styrene-alkyl methacrylate interpolymer is used in addition to or in place of the styrene-acrylonitrile interpolymer described above. The styrene-alkyl methacrylate polymer is prepared from a monomeric mixture comprising about 25 to 75 weight percent styrene, nuclear-substituted styrenes and alpha-substituted styrenes polymerized with about 25 to 75 weight percent of an alkyl methacrylate. Useful mixtures of this type are described in the before-mentioned copending Schwaegerle application and are preferably prepared by mixing 100 weight parts of polyvinyl chloride, about 5 to 20 weight parts of a copolymer containing about 40 to 60 weight percent methyl methacrylate copolymerized with about 60 to 40 weight percent styrene, with about 2 to 15 weight parts of iron oxide.

Valuable heat and light stable compositions are made from the rigid shock-resistant vinyl halide polymer compositions described in the copending patent application of Clarence E. Parks and George L. Wheelock, filed May 6, 1953, Serial No. 353,446. These compositions comprise about 100 weight parts of a rigid vinyl halide polymer of a monomeric material comprised predominantly of vinyl halide, which may include lesser amounts of other monoolefinic monomers copolymerized therewith, a resinous polymer of a predominantly monoolefinic mixture comprising from 50 to 90 weight percent of a monomer selected from the class consisting of styrene and polymerizable styrene derivatives, both alpha- and nuclear-substituted, and 10 to 50 weight percent of an acrylonitrile copolymerizable with the styrene monomer, said polymer being present in the composition in amount of 1 to 40 weight parts; a rubbery interpolymer of a monomer mixture comprising 50 to 90 weight percent of a 1,3-butadiene hydrocarbon, 5 to 30 weight percent of an acrylonitrile and 5 to 30 weight percent of at least one other monolefinic monomer copolymerizable with the 1,3-butadiene hydrocarbon and acrylonitrile, said interpolymer being present in the composition in an amount of from 1 to 25 weight parts based on 100 weight parts of the polyvinyl halide and the resinous polymer, and 1 to 100 weight parts of iron oxide. A composition illustrative of this class of rigid thermoplastic composition comprises 100 weight parts of polyvinyl chloride, from 5 to 15 weight parts of a copolymer of a monomer mixture containing 60 to 90 percent styrene and 10 to 40 percent acrylonitrile, and a rubbery interpolymer comprising about 65 to 70 percent 1,3-butadiene and about equal parts of acrylonitrile and another monomer selected from the class consisting of styrenes, alkyl acrylates and alkyl methacrylates, said rubber interpolymer being present in an amount from about 5 to 15 weight parts based on 100 weight parts of polyvinyl chloride and the copolymer of styrene and acrylonitrile; and from about 2 to 15 weight parts of ferric oxide.

The compositions of this invention may be combined, of course, with the usual compounding ingredients known to the art such as other stabilizers including basic lead carbonate, lead silicate, calcium silicate and others; fillers including fine ground hard clay, white coloring pigments, carbon black, extenders, waxes, lubricants, plasticizers, other resinous substances and the like.

The preparation of the heat and light stable compositions of this invention are described in the following specific examples. All parts are parts by weight.

Example I

Polyvinyl chloride is made by polymerizing vinyl chloride at about 35 to 50° C. in an aqueous dispersion and the product is obtained in the form of uniform particles having an average particle size of about 64 microns, and an average specific viscosity (at 20° C. of a 0.4 percent solution in nitrobenzene) of 0.55. A styrene-acrylonitrile copolymer is obtained by polymerizing at 40° C. in aqueous emulsion a monomer mixture of 75 weight parts of styrene and 25 weight parts of acrylonitrile. A mixture of these two materials is prepared employing 10 dry weight percent of the copolymer of styrene and acrylonitrile based on the dry weight of polyvinyl chloride. The mixture may be obtained by admixing the wet dispersions of polymers and drying the mixture, or by separately drying the two polymeric components and then mixing in the powder form or in separate stages on a hot plastic mill. Regardless of how the mixture is obtained, it should be processed in hot mixing equipment, for example, a hot two-roll plastic mill at about 300° F., so as to obtain an intimate mixture of the two polymer ingredients. While being mixed, 0.75 part of calcium stearate are added to the polymers and then 4 parts of red iron oxide which is thoroughly mixed therein. This composition is then molded by heat and pressure into test specimens. Test specimens of the composition have excellent structural properties including a tensile strength of about 6,000 pounds per square inch. When placed in an oven at 350° F., no obvious color degradation is observed at the end of one hour, and it is only after 90 minutes at this temperature that this composition begins to evidence slight color degradation. For comparison purposes, a similar composition which does not contain iron oxide shows obvious color degradation at a time prior to one hour's exposure at this temperature. Polyvinyl chloride alone containing iron oxide begins to exhibit color degradation after about 20 minutes' exposure at this temperature.

Example II 100 weight parts of high molecular weight polyvinyl chloride powder and 10 parts of a resin in powder form, which is made by polymerizing in emulsion a monomer mixture containing 75 parts of styrene and 25 parts of acrylonitrile, are intimately mixed and blended. 100 parts of this resin mixture are placed in a dough-type mixer and 2 parts of tin mercaptide added thereto. A rubbery interpolymer having a Mooney value of about 70 ML and prepared by polymerizing a monomer mixture of 67 parts of 1,3-butadiene, 16 parts of acrylonitrile and 17 parts of styrene in a fatty acid soap emulsion at a temperature of 30° C. with potassium persulfate is mixed with the resin mixture in a proportion of 10 parts of interpolymer to 100 of the mixture. The mixture of components is worked on a close set two-roll plastic mill at about 300° F. and 0.75 part of calcium stearate and 4 parts of red iron oxide are added thereto and intimately mixed. The resulting product is cut off the mill and molded in standard test molds for 5 minutes under pressure at 340° F., the molds cooled and the molded stock removed. Test specimens of this composition are found to have tensile strengths of 5,800 pounds per square inch, flexural strengths of 11,000 pounds per square inch, and an Izod impact value of 16 foot pounds per inch of notch, and will withstand two hours exposure in an oven at 350° F. without noticeable color change. 200 hours' exposure in the Atlas fadeometer results in very slight darkening and no degradation of physical properties. Samples exposed to one full year of Florida sunlight-aging and exposure result in no changes in color nor in physical properties.

Example III

A mixture of polyvinyl chloride, a copolymer of styrene-acrylonitrile and a rubbery interpolymer of the types described in Example II is prepared and mill-mixed with 6 parts of yellow iron oxide. Molded test specimens of this material withstand two hours' exposure in an oven at 350° F. without any noticeable color change or degradation of physical properties.

Example IV

A composition of 100 weight parts of polyvinyl chloride, 10 weight parts of a copolymer of about 50 percent styrene and about 50 percent methyl methacrylate and the rubbery interpolymer of butadiene-1,3, acrylonitrile and styrene described in Example II are mixed as described in Example II with 2 parts of calcium stearate and 8 parts of brown iron oxide. This composition is readily extruded or calendered and is likewise resistant to oven aging, even after several hours' exposure in an oven at 350° F.

When other rigid vinyl halide resins such as copolymers of vinyl chloride with vinyl acetate, other styrene-acrylonitrile polymers such as alpha-methyl styrene and acrylonitrile, and other styrene-alkyl methacrylate polymers such as alpha-methyl styrene and isopropyl methacrylate are similarly employed, useful rigid, processable, thermoplastic vinyl halide polymer compounds of outstanding heat and light resistance are obtained.

The heat and light stable, rigid, thermoplastic compositions of this invention find many uses in articles that are exposed to weather extremes and other unusual conditions including heat. Valuable construction materials in the form of slabs, sheets, pipes and the like are representative of such use.

While certain preferred embodiments of this invention have been described in the examples, it is not desired or intended to limit the invention solely thereto for as has been disclosed, the materials, proportions and methods may be varied within limits and equivalents may be employed without departing from the scope and spirit of the invention as defined in the appended claims, and it is to these only that we intend to limit the invention.

We claim:

1. A heat and light resistant thermoplastic resinous composition comprising a homogeneous mixture of 100 parts of polyvinyl chloride with hard tough interpolymers of a monolefinic mixture comprising a monomer selected from the class consisting of styrene and substituted styrenes containing, as nuclear- and alpha-substituents, halogen atoms, alkyl groups, and alkoxy groups and a monomer copolymerizable therewith selected from the class consisting of acrylonitrile, methacrylonitrile, ethacrylonitrile, chloroacrylonitrile and alkyl methacrylates, said hard tough interpolymer containing not to exceed 20 percent by weight of other polymerized monoolefinic monomers, said composition containing from 1 to 40 weight parts of hard tough interpolymer, and from 2 to 15 weight parts of iron oxide based on the weight of the polymers.

2. A hard, tough, and rigid heat and light resistant thermoplastic resinous composition comprising 100 weight parts of a homogeneous mixture of polyvinyl chloride, from 1 to 40 weight parts of a hard tough interpolymer of about 50 to 90 weight percent styrene and about 10 to 50 weight percent acrylonitrile, and about 2 to 15 weight parts of ferric oxide based on the weight of the polymer mixture.

3. A hard, tough, and rigid heat and light resistant thermoplastic resinous composition comprising 100 weight parts of a homogeneous mixture of polyvinyl chloride, from 1 to 40 weight parts of a hard, tough interpolymer of about 40 to 60 weight percent styrene and about 60 to 40 weight percent methyl methacrylate, and about 2 to 15 weight parts of ferric oxide based on the weight of the polymer mixture.

4. A hard, tough, and rigid heat and light resistant thermoplastic resinous composition comprising 100 weight parts of a homogeneous mixture of polyvinyl chloride, from 1 to 40 weight parts of a hard, tough interpolymer of about 50 to 90 weight percent alpha-methyl styrene and about 10 to 50 weight percent acrylonitrile, and about 2 to 15 weight parts of ferric oxide based on the weight of the polymer mixture.

5. A heat and light resistant rigid thermoplastic resinous composition comprising a homogeneous mixture of 100 weight parts of a high molecular weight polyvinyl chloride with 5 to 20 weight parts of a hard copolymer of 65 to 85 weight percent styrene and 15 to 35 weight percent acrylonitrile, and about 2 to 15 weight parts of finely-divided ferric oxide based on the weight of the polymer mixture.

References Cited in the file of this patent

UNITED STATES PATENTS

| | | |
|---|---|---|
| 2,302,361 | Yngve | Nov. 17, 1942 |
| 2,563,772 | Cheney | Aug. 7, 1951 |
| 2,646,417 | Jennings | July 21, 1953 |
| 2,773,851 | Tolman | Dec. 11, 1956 |
| 2,807,603 | Parks et al. | Sept. 24, 1957 |

OTHER REFERENCES

Lalley et al.: Modern Plastics, vol. 27, December 1949.

Mattiello: Protective and Decorative Coatings, John Wiley & Sons, New York (1942), pages 287 and 323. (Copy in Sci. Lib.)

Mattiello: Protective and Decorative Coatings, John Wiley & Sons, N. Y. (1942), p. 324. (Copy in Sci. Lib.)

Modern Plastics Encyclopedia (1949), pp. 315 and 316, Plastics Catalogue Corp., N. Y. (Copy in Sci. Lib.)